United States Patent [19]

Erbe et al.

[11] Patent Number: 4,699,455

[45] Date of Patent: Oct. 13, 1987

[54] FIBER OPTIC CONNECTOR

[75] Inventors: Raymond A. Erbe, Milwaukee; Richard J. Molus, Sr., Greenfield; James Barnak, Bristol; Mack I. Herson, South Milwaukee, all of Wis.

[73] Assignee: Allen-Bradley Company, Milwaukee, Wis.

[21] Appl. No.: 702,820

[22] Filed: Feb. 19, 1985

[51] Int. Cl.⁴ .......................... G02B 6/36; G02B 7/26
[52] U.S. Cl. .................................. 350/96.20
[58] Field of Search ............... 350/96.20, 96.21, 96.22

[56] References Cited

U.S. PATENT DOCUMENTS

| | | | |
|---|---|---|---|
| 3,947,182 | 3/1976 | McCartney | 350/96 C |
| 3,984,174 | 10/1976 | Landgreen | 350/96 C |
| 3,999,837 | 12/1976 | Bowen et al. | 350/96 C |
| 4,118,105 | 10/1978 | Voigt | 350/96.20 |
| 4,151,580 | 4/1979 | Struger et al. | 361/415 |
| 4,167,303 | 9/1979 | Bowen et al. | 350/96.21 |
| 4,186,995 | 2/1980 | Schumacher | 350/96.20 |
| 4,186,996 | 2/1980 | Bowen et al. | 350/96.20 |
| 4,186,999 | 2/1980 | Harwood et al. | 350/96.21 |
| 4,217,030 | 8/1980 | Howarth | 350/96.21 |
| 4,252,406 | 2/1981 | Ryan, Jr. et al. | 350/96.21 |
| 4,273,413 | 6/1981 | Bendiksen et al. | 350/96.21 |
| 4,432,604 | 2/1984 | Schwab | 350/96.21 |
| 4,449,784 | 5/1984 | Basov et al. | 350/96.21 |
| 4,588,256 | 5/1986 | Onstott et al. | 350/96.21 |
| 4,630,886 | 12/1986 | Lauriello et al. | 350/96.20 |

OTHER PUBLICATIONS

Dorran Photonics Incorporated Data Sheets DSC-3A and DMC-1A, both dated Apr. 1983 and published by Dorran Photonics Inc., 35 Center Ave., Atlantic Highlands, NY 07716.

"Fiber Optic Connections: A Tutorial Overview" by L M. Borsuk, Electronic Packaging and Production, Jul. 1979.

"Optical Fibre Connectors" by Dr. J. C. Challans, *New Electronics*, Jan. 27, 1981.

*Primary Examiner*—Robert E. Wise
*Attorney, Agent, or Firm*—Quarles & Brady

[57] ABSTRACT

A connector for coupling an optical cable including at least one optical fiber terminated in an optical contact to a phototransducer device is disclosed. A swivel member mounts the optical contact with a terminal end of the contact adjacent to an inner side of the swivel member. The swivel member is received within a connector body and is movable therein. A base member mounts the photo-transducer device with the photo-transducer accessible from an inner side of the base member. Mating surfaces are formed on the inner sides of the swivel and base members, to guide the terminal end of the contact and the photo-transducer device into alignment as the connector body is moved to a connected position adjacent to the base member. Biasing means between the connector body and the swivel member urges the swivel member toward the base member and allows the swivel member to align itself with the base member. Means are also provided for securing the connector body in the connected position. This construction provides an accurate and readily separable connection between the optical contact and the photo-transducer device. In one aspect, a swing arm arrangement provides general registration between the swivel and base members to facilitate accurate alignment between the contact and photo-transducer device.

3 Claims, 12 Drawing Figures 4,699,455

FIBER OPTIC CONNECTOR

BACKGROUND OF THE INVENTION

This invention relates to fiber optic connectors, and particularly to fiber optic connectors for coupling a fiber optic cable to a photo-transducer device.

Connectors for coupling fiber optic cables to photo-transducer devices such as opto-electronic detectors and emitters must be capable of providing very accurate alignment between the optical fiber and the transducer. Providing alignment between an optical fiber of about 200 microns diameter and an area on the photo-transducer of about 1100 microns diameter is typical.

In some industrial applications, many connections between a conductor and a device are necessary. For example, in applications using solid state controllers, the connection between I/O circuit boards and external devices may involve hundreds or even thousands of connections. The circuit boards are typically held within a rack with a connector mounted to the rack which can be moved from a disconnected position to a connected position to complete a number of connections. While this type of an arrangement has been found to work well for electrical conductors, the dimensions of the rack cannot be economically controlled to yield the accuracy required by fiber optic conductors.

In spite of the accurate alignment required to make fiber optic connections, it is sometimes preferable to provide a readily separable fiber optic connection. Also, in some applications it is desirable to provide both optical and electrical connections in a single connector. Moreover, there may be many of each type of connection required by a given application. The requirements of such a connector are demanding because the electrical connections require a firm connection and the optical connections require extreme accuracy. For industrial applications, the connector must also be inexpensive to produce.

Optical cables are typically terminated with optical contacts. The manufacture of such optical contacts is a specialized art in itself. However, there are many different firms which provide optical contacts in the marketplace. Some prior art connectors require highly specialized contacts to achieve the necessary alignment accuracy and therefore cannot be adapted to use commercially available contacts. The difficulty and expense of procuring and using the specialized contacts can be a deterent to using fiber optics altogether.

Easy assembly and maintenance of the connector can also be important. In the prior art connectors using specialized contacts, particularly those where several contacts are included in a single connector, the cables can be difficult to install and/or replace. While in laboratory applications replacement of cables may not be a major consideration, in industrial environments fiber optic cables are somewhat susceptible to damage. Facile replacement of cables to connectors can therefore gain prominence to simplify system maintenance.

SUMMARY OF THE INVENTION

The invention provides a connector for coupling an optical cable, including at least one optical fiber terminated in an optical contact, to a photo-transducer device. A swivel member is suitable to mount the optical contact with a terminal end of the contact adjacent to an inner side of the swivel member. A connector body defines a cavity for loosely receiving the swivel member to allow the swivel member to move within the connector body. A base member mounts the photo-transducer with the photo-transducer being accessible from an inner side of the base member. Mating surfaces are formed on the inner side of the swivel member and on the inner side of the base member to guide the optical contact and the photo-transducer into alignment as the connector body is moved to a connected position adjacent to the base member. Biasing means between the connector body and the swivel member allows the swivel member to align itself with the base member and urges the swivel member toward the base member. Means are also provided for securing the connector body in the connected position. This arrangement provides accurate alignment between the optical contact and the photo-transducer and is readily separable at the optical interface between the contact and the photo-transducer.

A fiber optic connector of the invention is suitable to be incorporated within a bank of similar fiber optic connectors by providing a plurality of swivel members within a single connector body and a plurality of corresponding base members, preferably within a base module. Thereby, a plurality of connections can be made by moving the connector body to the connected position. Also, since the invention can be applied to commercially-available fiber optic contacts and each contact is separately and easily mountable to each swivel member, the servicability of the connector is not sacrificed.

In an especially useful embodiment, connectors of the invention are incorporated in a swing arm arrangement. The base members are mounted on circuit boards which are supported in a rack. A swing arm, including the connector body and the swivel members, is pivotally attached to the rack to swing from a disconnected position where the swivel members do not engage the base members to the connected position. The connector body and the rack provide general registration between the swivel and base members when the connector body is swung to the connected position. The mating surfaces on the swivel and base members provide final alignment to accurately align the optical contact and the photo-transducer.

A connector of the invention may, in addition to optical connections, provide readily separable electrical connections. The alignment provided by the connector body aligns electrical contacts fixed to the connector body with their associated contacts to firmly engage the associated contacts. Yet, although the connector body is rigidified by the electrical contacts engaging their associated contacts, the swivel members can move within the contact body to align the optical contact with the photo-transducer device.

In the preferred embodiment, the electrical contacts are included in a number of transducer assemblies to provide easily separable optical interfaces and easily separable electrical interfaces in a single optical connector. Each transducer assembly is suitable to be connected to a fiber optic contact and includes a photo-transducer device and a set of electrical contacts connected to electrodes of the photo-transducer device. In the swing arm embodiment, the electrical contacts are suitable to engage electrical contacts on the circuit board as the swing arm is swung into the connected position. This type of connector finds particular application where optical connections are particularly desirable at external devices and some electrical connections are preferred at the connector interface.

It is therefore a principal object of the invention to provide a fiber optic connector which provides accurate alignment between an optical fiber and a photo-transducer device. This object is accomplished by providing a swivel member to house an optical contact and which can align itself within a connector body to a base member.

It is another object of the invention to provide a fiber optic connector which is adaptable to being incorporated into a bank of similar connectors. This object is achieved because each swivel member can move independently of the other swivel members within a single connector body to align itself with its associated base member.

It is another object of the invention to provide a fiber optic connector which is easy to service and maintain. This object is accomplished because each optical contact is readily and separately securable to each swivel member.

It is another object of the invention to provide a fiber optic connector which does not employ highly specialized optical contacts so that it can be adapted to commercially available contacts. This object is accomplished by divorcing the alignment function from the optical contact and providing a swivel member, to which the optical contact is readily securable, to perform the alignment function.

Another object of the invention is to provide a fiber optic connector or bank of connectors to easily and quickly couple optical fibers to photo-transducers with good alignment accuracy. The swing arm arrangement facilitates the accomplishment of this object.

Another object of the invention is to provide a fiber optic connector which can provide both readily separable optical and electrical connections in a single connector. This object is achieved because the connector body provides rough alignment to align the electrical contacts of the transducer assemblies with their associated contacts and to align the swivel and base members with one another. Final, accurate alignment between the optical contact and the photo-transducer is then provided by the mating surfaces on the swivel and base members.

Another object of the invention is to provide a connector for optically coupling fiber optic cables to phototransducer devices and for electrically coupling other fiber optic cables to electrical contacts. This object is accomplished by providing transducer assemblies in a connector including swivel members which are matable with base members.

Another object of the invention is to provide a fiber optic connector which is economical to produce. This object is accomplished because the connector is adaptable to being provided in an assembly of plastic molded parts.

These and other objects and advantages of the invention will become apparent from the drawings and from the following detailed description.

DETAILED DESCRIPTION OF THE PREFERRED EMBODIMENT

Figure 1:
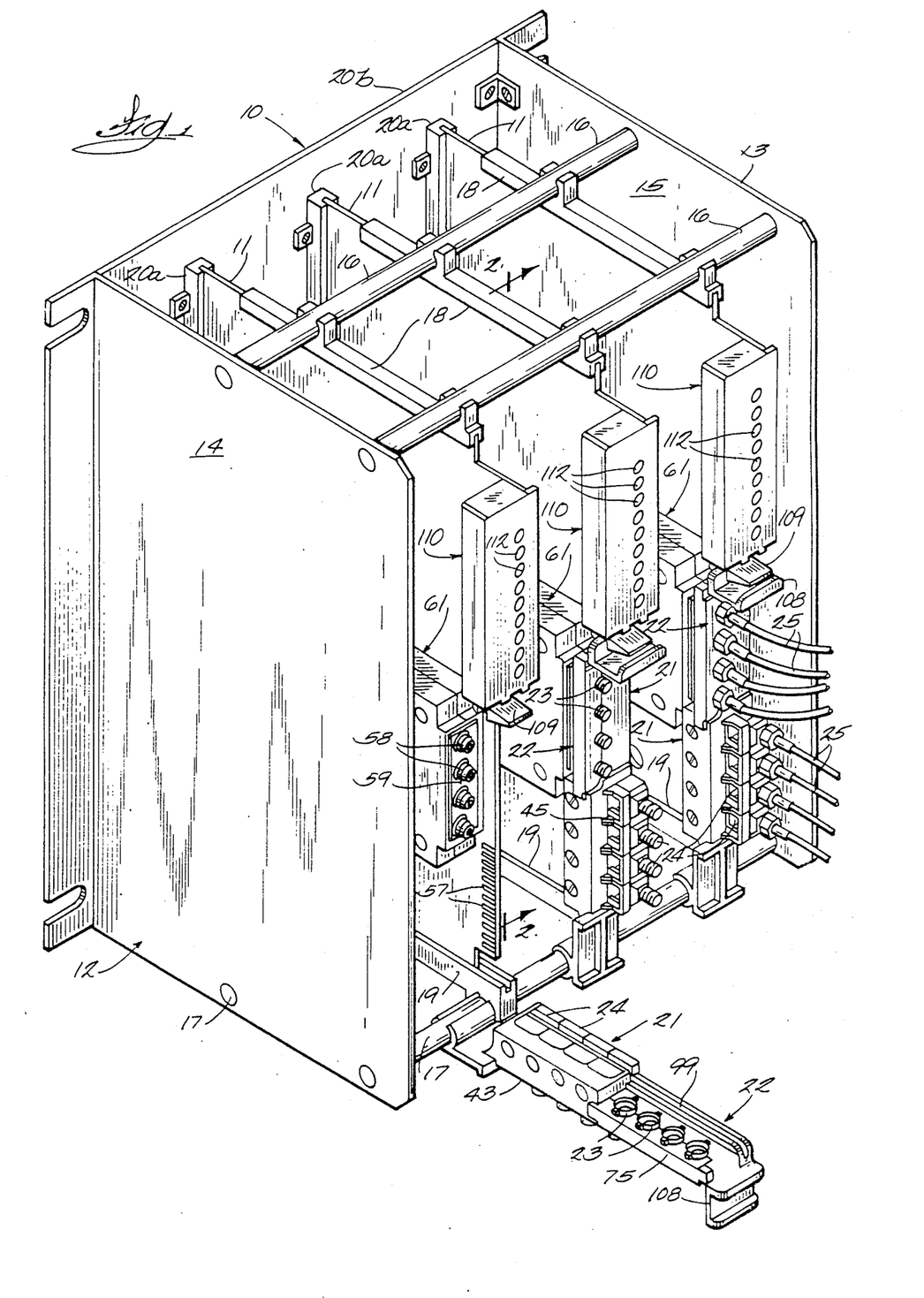
FIG. 1 is a perspective view of a controller which incorporates fiber optic connectors of the invention.

Referring to FIG. 1, the invention is shown embodied in a controller 10 having three circuit boards 11 held within a rack 12. While only three boards are shown, one skilled in the art can appreciate that there can be many more boards in such controllers and that the particular arrangement and mounting of the boards in the controllers can vary greatly.

The rack 12 includes a frame 13 having a pair of upright side walls 14 and 15 which are fastened to one another by a pair of upper support rods 16 and a pair of lower support rods 17. A set of upper guide rails 18 connect the upper support rods 16 and a set of lower guide rails 19 connect the lower support rods 17. Each of the guide rails 18 and 19 has a slot to receive the respective top or bottom edge of one of the circuit boards 11. The guide rails 18 and 19 are spaced at regular intervals along the respective support rods 16 and 17 so that the circuit boards 11 are retained between the side walls 14 and 15 in closely spaced, substantially parallel planes.

Figure 2:
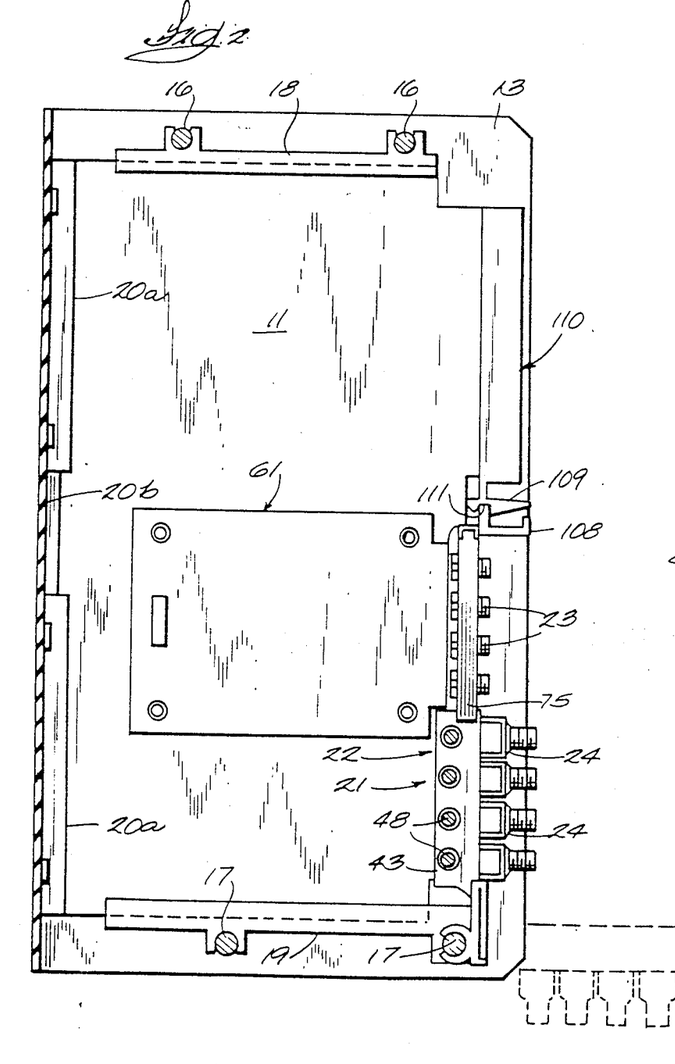
FIG. 2 is a sectional view taken from the plane of the line 2—2 of FIG. 1.

Referring to FIG. 2, each of the circuit boards 11 is substantially rectangular and has front and rear edges perpendicular to the top and bottom edges. The rear edge of each circuit board 11 is received in a set of female plugs 20a mounted on a mother board 20b located at the rear of the frame 13. A connector of the invention is provided adjacent to the lower half of the front edge of each circuit board 11. A controller of the type herein contemplated, but having boards with only electrical interfaces, is fully disclosed in U.S. Pat. No. 4,151,580 issued April 24, 1979 to Struger, et al. The entire disclosure of the Struger, et al. patent is hereby incorporated by reference.

Each connector includes a swing arm 21. Referring to FIG. 1, three swing arms 21, one for each circuit board 11, are pivotally mounted to the front lower support rod 17. The swing arms 21 are mounted to the support rod 17 in the space between the guide rails 19 to limit axial sliding of the swing arms 21 and the guide rails 19 on the support rod 17. It may also be desirable to provide spacer sleeves or to space the circuit boards closer together to further limit axial sliding of the swing arms 21. Each swing arm 21 is swingable from a disconnected position as shown by the left-most swing arm 21 in FIG.

1, to a connected position as shown by the two right swing arms 21.

Each swing arm 21 includes a connector body 22, four swivel members 23 mounted in the upper portion of the connector body 22 and four transducer assemblies 24 secured to the lower portion of the connector body 22. Each of the swivel members 23 and each of the transducer assemblies 24 is suitable for fastening to an optical cable 25, as illustrated by the right most swing arm in FIG. 1.

Figure 4:
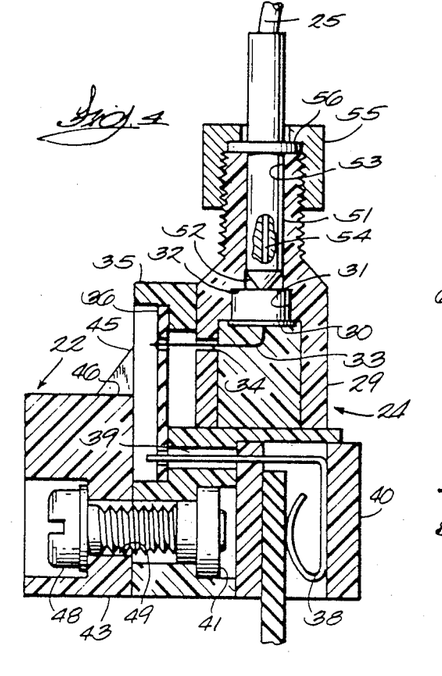
FIG. 4 is a sectional view taken from the plane of the line 4—4 of FIG. 3 and shown with an optical cable mounted in place.

Referring to FIG. 4, each transducer assembly includes an active device mount 29 and a phototransducer device such as a light emitter 30. The emitter 30 is closely received in a bore 31 in the active device mount 29 with the top of the emitter preferably abutting a shoulder 32 to accurately position the emitter with respect to the top of the active device mount 29. The emitter 30 has a set of electrodes 33 which are bent to extend through corresponding holes 34 in the active device mount 29 and the space defined by the active device mount 29 beneath the emitter 30 is filled with a potting compound to seal and to bond the emitter in place. Active device mounts which are provided with a potted emitter are commercially available from various manufacturers, including Hewlett-Packard Corporation.

The active device mount 29 is then secured to a connector case 35 by adhesive bonding, ultrasonic welding or other appropriate means. A connecting means such as a circuit board 36 is disposed within a recess of the connector case 35 and the emitter electrodes 33 are soldered or otherwise electrically coupled to appropriate terminals of the circuit board 36. These terminals are conductively linked to the electrodes of a set of spring type electrical contacts 38. The contact electrodes extend through holes 39 in the connector case 35 and into a contact envelope 40 which houses the contacts 38. A captive nut 41 is provided in a recess in the connector case 35 and the contact envelope 40 is bonded, ultrasonically welded, or otherwise secure to the connector case 35.

Figures 5, 8:
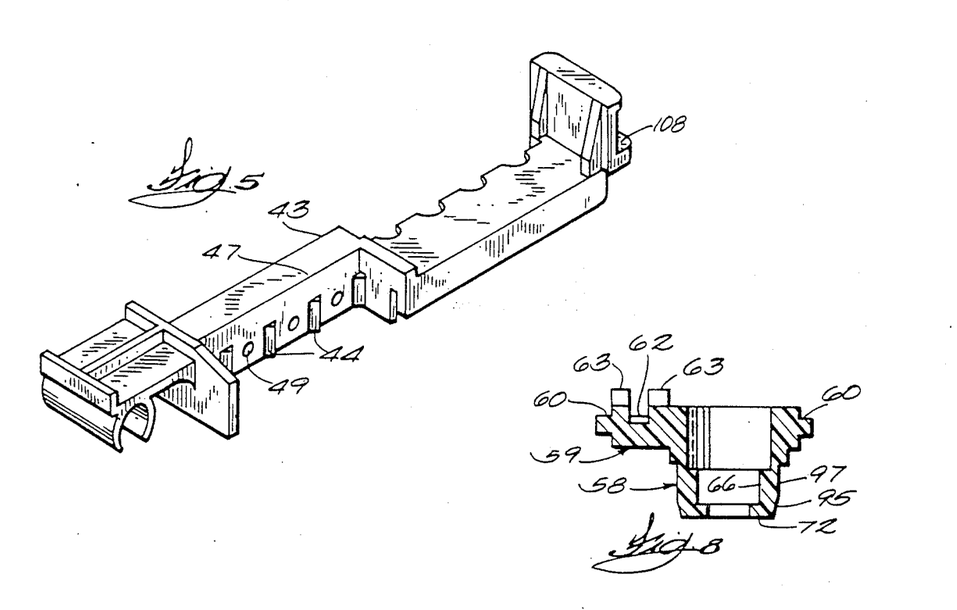
FIG. 5 is a perspective view of a swing arm frame for the connector.
FIG. 8 is a sectional view taken from the plane of the line 8—8 of FIG. 6.
Figures 6, 7:
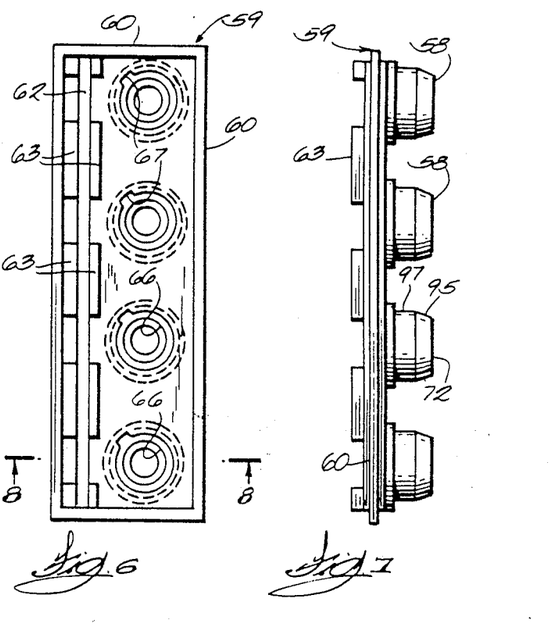
FIG. 6 is a rear plan view of a base module for the connector.
FIG. 7 is a side plan view of the base module of FIG. 6.

Each transducer assembly 24 as thus assembled is mounted to a swing arm frame 43, which is part of the connector body 22. Referring to FIG. 5, the swing arm frame 43 is provided with spaced apart triangular ribs 44. These ribs mate with beveled corners (not shown) of the connector case 35 to position each transducer assembly 24 along the swing arm frame 43. The connector case 35 is also provided with prongs 45 (FIGS. 1 and 4) which define shoulders 46. The shoulders 46 fit over a corner 47 of the swing arm frame 43. A screw 48 extends through a hole 49 in the swing arm frame 43 and engages the captive nut 41 to secure the transducer assembly 24 to the frame 43.

One of the optical cables 25 is connected to each transducer assembly 24 in the following manner. The cable 25 is first terminated in a suitable optical contact 51. These optical contacts are commercially available and the termination procedure is usually specified by the manufacturer so need not be described in detail here. Suffice it to say that the contact 51 has a terminal end 52 at which at least one optical fiber 54, which is the light conducting element of the cable 25, is very accurately positioned at the center of the contact 51. The contact 51 is closely received in a bore 53 of the active device mount 29 which extends to the emitter 30. The bore 53 is concentric with the bore 31 so that the fiber 54 is positioned at or very near the center of the emitter 30.

The terminal end 52 preferably abuts the emitter 30, although a small gap will probably be acceptable for most applications. The contact 51 is secured to the transducer assembly 24 by a cap nut 55 which screws onto threads provided on the active device mount 29. A flange 56 formed on the contact is captivated between the cap nut 55 and the end of the active device mount 29 to securely hold the contact 51 within the active device mount 29.

The connection between the optical contact 51 and the transducer assembly 24 is not easily separable. Connection is made by inserting the contact into the bore 53 and turning the cap nut 55 until it tightens against the flange 56. Disconnection is made by reversing this procedure. If more than a few connections or disconnections need be made, this task becomes tedious and time consuming.

However, the connection between the transducer assembly 24 and the circuit board 11 is easy to make and break. As a swing arm 21 is pivoted into the connect position, the front edge of the board 11 enters the contact envelope 40 and the electrical contacts 38 engage contact pads 57 (FIG. 1) which are printed along the edge of the circuit board (on the side opposite from that shown in FIG. 1) and are aligned with the associated contacts 38.

The active device mount 29, the connector case 35 and the swing arm frame 43 are all preferably molded from plastic materials. The dimensional accuracy required to align the contacts 38 with the contact pads 57 is readily provided by the rack 12, the circuit board 11, the swing arm frame 43 and the transducer assemblies 24. The much greater accuracy required to align the optical fiber 54 with the emitter 30 is likewise provided by the optical contact 51 and the active device mount 29. Thereby, an optical connector providing a readily separable electrical interface can be provided at relatively low cost.

However, easily separable electrical connections are not desirable in some applications. For example, although the current flow to and from most light emitter photo-transducers is adequate to maintain electrical contacts, the current flow associated with light detector photo-transducers is often too low to maintain such connections. To overcome this problem, among others, the connector body 22 and each swivel member 23 make up a part of a fiber optic connector which provides an easily separable optical interface between an optical fiber and a photo-transducer device.

The fiber optic connector includes a base member 58 for each swivel member 23. Four base members 58 are integrally molded into a base module 59 shown in FIGS. 6-9. The base module 59 is mounted in a two-piece case 61 by means of its recessed edges 60 which fit into corresponding grooves in the case. Of course, the base module 59 and the case 61 could be integrally molded or the base members 58 could be secured directly to the circuit board 11. A groove 62 is formed in the base module 59 which is bordered by ribs 63 in the spaces between the base members 58 and is suitable to receive the edge of a circuit board 64 (FIG. 9) which is mounted within the case 61. The case 61 is then mounted to the circuit board 11 and any appropriate connections between the circuit board 11 and the circuit board 64 can be made.

Figures 9, 10, 11, 12:
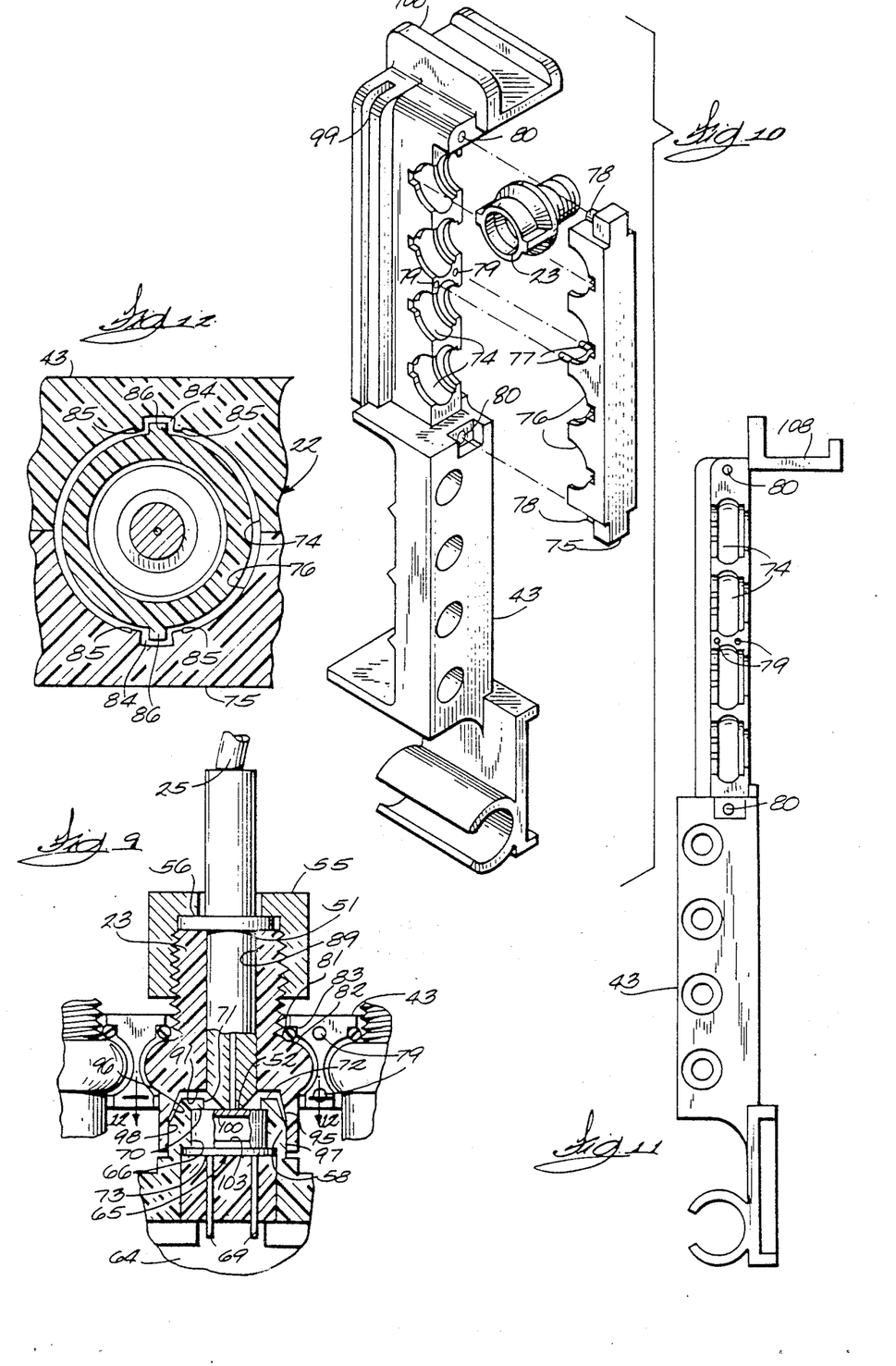
FIG. 9 is a sectional view taken from the plane of the line 9—9 of FIG. 3 and shown with an optical cable mounted in place.
FIG. 10 is an exploded perspective view of a connector body and a swivel member for the connector.
FIG. 11 is a side plan view of the swing arm frame of FIG. 5.
FIG. 12 is a sectional view taken from the plane of the line 12—12 of FIG. 9.

Referring particularly to FIG. 9, a photo-transducer device such as a detector 65 is closely received within a cylindrical bore 66 in each base member 58. A slot 67 (FIG. 6) may be provided in the base member 58 to receive a tab (not shown) on the detector 65 to properly orient electrodes 69 of the detector 65 with respect to the circuit board 64. The top of the detector abuts a shoulder 70 formed by a smaller radius bore 71 formed in the base member 58. The detector 65 is therefore accessible from an inner side 72 of the base member 58. The space beneath the detector 65, which is slightly larger in diameter than a flange 73 of the receiver, is filled with potting compound to seal and bond the detector in place. The detector electrodes 69 are preferably soldered into appropriate terminals on the circuit board 64. Soldering the electrodes insures the integrity of the interface between the electrodes and the circuit board which is important since the detector current can be very low.

Referring to FIGS. 9-11, four hemi-circular recesses 74 are formed in the swing arm frame 43 to receive the swivel members 23. The swivel members 23 are retained within the recesses by a retainer bar 75 illustrated in FIG. 10, which, together with the swing arm 43, makes up the connector body 22. Four hemi-circular recesses 76, which are mirror images of the recesses 74 formed in the swing arm frame 43, are formed in the retainer bar 75 so that the recesses 74 and 76 form four cavities in the connector body 22 when the swing arm frame 43 and the retainer bar 75 are assembled together. The retainer bar 75 has a pair of intermediate pins 77 and a pin 78 at each end which fit into holes 79 and 80, respectively, to align the retainer bar 75 with the swing arm frame 43. The retainer bar 75 is secured to the swing arm frame 43 by adhesive bonding, ultrasonic welding or otherwise.

Each swivel member 23 is retained within one of the cavities formed by the recesses 74 and 76 in the connector body 22. Referring to FIG. 9, each recess 74 and 76 and, therefore, the cavity formed by the recesses, follows the general contour of the swivel member 23. Each swivel member 23 is trapped within its cavity to prevent losing the swivel member but is allowed freedom to move within the cavity relative to the connector body 22.

A biasing means 81 in the form of a compressible elastomeric O-ring is disposed between an upwardly and outwardly facing shoulder 82 on the swivel member 23 and a downwardly and inwardly facing shoulder 83 defined by the cavity in the connector body 22. The biasing means 81 tends to center the swivel member 23 within the cavity and urges the swivel member 23 toward the base member 58. Referring to FIG. 12, each recess 74 and 76 has a slot 84 which is bordered by slightly raised ears 85 and the swivel member 23 has a pair of opposed ribs 86 which loosely fit into the slots 84 to restrain the rotation of the swivel member 23 relative to the connector body 22.

A contact 51 is inserted into a close-fitting bore 89 of the swivel member 23. The swivel member 23 is threaded so that a cap nut 55 can be used to fasten the contact 51 within the swivel member 23. The terminal end 52 of the contact 51 extends beyond the end of the bore 89 to being adjacent to an inner side 91 of the swivel member 23.

Mating surfaces formed on the inner side 72 of the base member 58 and on the inner side 91 of the swivel member 23 each have frusto-conical portions 95 and 96 and cylindrical portions 97 and 98, respectively. As the swing arm 21 is swung into the connected position, each swivel member 23 will be in general registration with its associated base member 58. A groove 99 is defined by the swing arm frame 43 to receive the edge of the circuit board 11 to aid alignment. As the swivel member 23 nears the base member 58, the frusto-conical surface 95 on the base member will guide the cylindrical surface 98 of the swivel member onto the cylindrical surface 97 of the base member. Note that this second state of alignment is possible because the swivel member is free to move within the connector body 22. The fit between the cylindrical surfaces 97 and 98 is either a slight interference fit or at least very close so that diametral alignment between the surfaces is assured. The frusto-conical surfaces 95 and 96 may also, or alternatively, be designed to mate with one another to provide good alignment. Preferably, the terminal end 52 of the contact 51 abuts a window 100 at the top of the detector 65 to stop the motion of the swivel member 23 toward the detector. When the terminal end 52 abuts the detector 65, further motion of the connector body 22 toward the base members 58 only results in compressing the biasing means 81.

The connector body 22 (including the swing arm frame 43 and the retainer bar 75), the swivel member 23, and the base module 50 are all molded from plastic materials. The photo-transducer detector 65 has a circular actiVe area 103 (FIG. 9) which is large with respect to the diameter of the light-carrying core of the fiber 54 to allow a certain dimensional deviation since the active area 103 need not be perfectly on center with the fiber 54 for an acceptable portion of the light from the fiber to fall upon the active area. A proper matching of the fiber 54 and the active are a 103 can therefore result in an allowable dimensional deviation which is greater than the dimensional deviation possible with the plastic molded swivel members 23 and base members 58.

Precision plastic molding processes provide tolerances of less than plus or minus 40 microns. With this accuracy, the center to center tolerance between the bore 89 and the bore 66 with the swivel member 23 and the base member 58 in mating relationship is about plus or minus 75 microns. Providing the bore 66 with a slight taper results in its diametral tolerance being about 25 microns, and the diametral tolerance of the bore 89 is about 50 microns. Therefore, the total center to center tolerance of a nominally sized detector 65 and connector 51 is no more than plus or minus 150 microns. While the tolerances of particular commercially available fibers, contacts and detectors are not normally available, they can be estimated as being no more than about plus or minus 115 microns combined to yield a total tolerance from the center of the fiber core to the center of the active area 103 of the detector 65 of about plus or minus 265 microns.

One other consideration that enters into the analysis if the end of the fiber 54 is not closely adjacent to the active area 103 is the numerical aperture of the fiber. Light propagates from the fiber along a cone shaped path which gets larger further away from the end of the fiber. The numerical aperture refers to a characteristic of the fiber which determines the angle of the cone-shaped path. Therefore, since the light spot size gets larger further away from the end of the fiber, the numerical aperture of the fiber and the distance the fiber end is away from the active area must be considered when selecting a fiber and a detector. Also, the window 100 has a refractive effect upon the light path which should be accounted for.

For a given fiber with a known core diameter and numerical aperture, and a given detector, the light spot size at the active area of the detector can be calculated and added to the total tolerance to yield an effective spot size. The effective spot size can then be compared to the detector manufacturer's specifications to ensure that the detector will have an acceptable responsivity. In the preferred embodiment, a cable having a 200 micron core diameter and a 230 micron cladding diameter single fiber sold under the trade designation HC-208-IU by Ensign-Bickford Co., Simsbury, CT was terminated with a contact sold under the trade designation Amp Optimate SMA Type Connector part number 227992-4 by Amp, Incorporated, Harrisburg, PA. The detector used is sold under the trade designation SD-3478 by Honeywell, Inc., Richardson, Texas. The combination of these devices incorporated in connectors of the invention was found to work well in practice. However, it should be understood that other combinations of fibers, contacts and receivers could be selected according to the principles outlined above and would achieve good results.

The relatively small total tolerance between the bores 89 and 66 is made possible because each swivel member 23 can move independently within the connector body 22. The movement of the swivel members compensates for tolerances such as the tolerance on the position of the base members relative to one another, the tolerance on the position of the base module relative to the circuit board, and the tolerance between the circuit board and the swing arm. Note that this last tolerance between the circuit board and the swing arm can be relatively large due to the construction of the rack 12. While the dimensional deviation of the rack could be more closely controlled with added expense, it need not be since the swivel members can move to allow for its dimensional deviation.

The contact 51 is assembled to the cable 25 in the field and the terminal end 52 is usually polished according to the contact manufacturer's specifications as part of the assembly process. Therefore, the distance from the terminal end 52 to the flange 56 of the contact can vary, depending upon the amount of polishing. Normally, the terminal end 52 of the contact should abut the window 100 of the detector 65 and the biasing means 81 will be, or will be on the verge of being, compressed. If the terminal end 52 has been polished less, but still has an adequate finish, the biasing member will be compressed more. Of course, if the terminal end 52 is polished too little, the finish on the end of the fiber will be so poor and the losses so great that a good connection cannot be made. On the other hand, if the terminal end is polished more than recommended, the terminal end may not touch the window of the detector. In this condition, the base member 58 may abut the swivel member 23 axially to stop the motion of the swivel member toward the base member. While a small gap between the terminal end 52 and the window 100 of the detector 65 may be satisfactory, too large of a gap will yield unacceptable losses. Also, a large gap results in the end of the fiber being spaced further from the active area so that the light spot on the active area is larger, thereby diminishing the allowable dimensional deviation between the fiber core and the active area.

As best shown in FIGS. 1 and 2, the swing arm 21 is locked in the connected position by a swing arm latching mechanism which includes a latch 108 formed at the upper or extended end of the connector body 22. A flexible keeper 109 is formed at the lower end of an indicator light bank 110. A notch 111 is formed in the keeper 109 to receive the latch 108. The keeper 109 may be flexed upwardly to disengage the latch 108 to release the swing arm 21 from the connected position. Note that the swing arm latching mechanism can also serve to hold the circuit board 11 within the rack 12 when the swing arm 21 is in the connected position. Alternatively, other means can be provided for holding the circuit board 11 within the rack 12, such as that disclosed in U.S. Pat. No. 3,691,430 issued to Lawrence F. Freitag and entitled "Circuit Board Assembly with Positive Catch".

Figure 3:
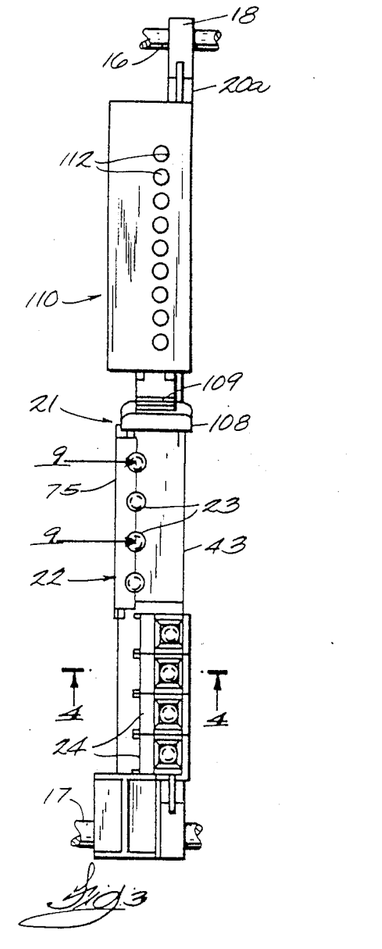
FIG. 3 is a front plan view of a portion of the controller of FIG. 1.

Also, as shown in FIGS. 1-3, the indicator light bank 110 is mounted along the edge of the circuit board 11 above each swing arm 21. A set of status indicator lights 112 or other circuit elements, such as trimmer potentiometers, can be mounted in the light bank 110 for easy access and display.

Numerous modifications and variations to the preferred embodiment will be apparent to those skilled in the art which will, however, still embody the invention. For example, the invention could be applied to single fiber cables, as in the preferred embodiment, or to multi-fiber cables. Also, while the contact illustrated has a tapered end, a contact could be used which does not have a tapered end. Therefore, the scope of the invention is not intended to be limited to the preferred embodiment shown and described in detail, but by the claims which follow.

We claim:

1. A connector for coupling an optical cable terminated in an optical contact to a first photo-transducer device supported by a circuit board which is held within a rack, comprising:
    a base member connected to said circuit board for mounting said first photo-transducer with said first photo-transducer in optical communication with an inner side of said base member;
    a swivel member for mounting said optical contact with a terminal end of said optical contact adjacent to an inner side of said swivel member;
    a connector body defining a cavity for loosely receiving said swivel member to allow said swivel member to move axially and angularly within said connector body;
    means for pivotally connecting said connector body to said rack to allow swinging said connector body to move the inner side of said swivel member into general registration with the inner side of said base member;
    mating surfaces formed on said inner side of said swivel member and on said inner side of said base member to guide said terminal end of said optical contact and said first photo-transducer into accurate alignment as the connector body is swung to a connected position;
    biasing means between said connector body and said swivel member to urge said swivel member toward said base member and to allow said swivel member to accurately align itself angularly and axially with said base member; and
    means for securing said connector body in said connected position.

2. A connector as in claim 1, wherein:

the base member is connected to the circuit board adjacent to an edge of the circuit board; and a portion of the edge of the circuit board is provided with electrical contact pads; and further comprising:

a transducer assembly including (a) a second photo-transducer device, (b) electrical contact means connected to said second photo-transducer device which are suitable to provide a readily separable connection with said electrical contact pads, and (c) means for coupling an optical contact to said second photo-transducer device; and means on said connector body for mounting said transducer assembly with said electrical contact means engaging said electrical contact pads when said connector body is swung to the connected position.

3. A connector as in claim 2, wherein:

the connector body houses a plurality of swivel members and a biasing means for each swivel member;

a similar plurality of base members, each mounting a first photo-transducer device, are provided in an integral base module; and a plurality of transducer assemblies are provided with a similar plurality of means on said connector body for mounting said transducer assemblies.

* * * * *